US012519566B2

United States Patent
Bar-Or Tillinger et al.

(10) Patent No.: US 12,519,566 B2
(45) Date of Patent: Jan. 6, 2026

(54) POWER SAVING USING PREDICTIONS RELATED TO LOW DENSITY PARITY CHECK DECODING SUCCESS

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); Idan Michael Horn, Hod Hasharon (IL); Peer Berger, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 18/494,386

(22) Filed: Oct. 25, 2023

(65) Prior Publication Data

US 2025/0141594 A1     May 1, 2025

(51) Int. Cl.
*H04L 1/00* (2006.01)
(52) U.S. Cl.
CPC .......... *H04L 1/0057* (2013.01); *H04L 1/0045* (2013.01)
(58) Field of Classification Search
CPC ............................. H04L 1/0057; H04L 1/0045
See application file for complete search history.

(56) References Cited

U.S. PATENT DOCUMENTS

| | | | | |
|---|---|---|---|---|
| 8,392,809 | B1* | 3/2013 | Varnica | H03M 13/2906 714/763 |
| 10,298,265 | B2* | 5/2019 | Gilbert | H03M 13/3723 |
| 10,574,273 | B1* | 2/2020 | Rottela | H04L 25/067 |
| 10,963,338 | B1* | 3/2021 | Steiner | G11C 29/50004 |
| 2003/0131305 | A1* | 7/2003 | Taguchi | H03M 13/2957 714/755 |
| 2010/0125764 | A1* | 5/2010 | Kose | H03M 13/3738 714/704 |
| 2013/0163328 | A1* | 6/2013 | Karakulak | G11C 16/26 365/185.18 |
| 2015/0331748 | A1* | 11/2015 | Cohen | G06F 11/1012 714/764 |
| 2016/0191078 | A1* | 6/2016 | Gilbert | H03M 13/1128 714/776 |
| 2018/0109354 | A1* | 4/2018 | Ahirwar | H03M 13/1102 |
| 2018/0357530 | A1* | 12/2018 | Beery | H04L 1/0045 |
| 2020/0235758 | A1* | 7/2020 | Khude | G06N 20/00 |
| 2024/0072929 | A1* | 2/2024 | Bar-Or Tillinger | H04L 1/18 |

* cited by examiner

*Primary Examiner* — Joseph D Torres
(74) *Attorney, Agent, or Firm* — Harrity & Harrity, LLP

(57) ABSTRACT

Various aspects of the present disclosure generally relate to wireless communication. In some aspects, a wireless node may receive a code block. The wireless node may predict a low density parity check (LDPC) decoding result for the code block in accordance with received log likelihood ratio (LLR) histogram information associated with the code block. The wireless node may configure an LDPC decoder in accordance with the predicted LDPC decoding result for the code block. Numerous other aspects are described.

30 Claims, 9 Drawing Sheets

645
Equations for obtaining numerical mutual information of LLR value

650
Example neural network for predicting LPDC decoding result

POWER SAVING USING PREDICTIONS RELATED TO LOW DENSITY PARITY CHECK DECODING SUCCESS

FIELD OF THE DISCLOSURE

Aspects of the present disclosure generally relate to wireless communication and to techniques and apparatuses for power saving using predictions related to low density parity check (LDPC) decoding success.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method of wireless communication performed by a wireless node. The method includes receiving a code block. The method includes predicting a low density parity check (LDPC) decoding result for the code block in accordance with received log likelihood ratio (LLR) histogram information associated with the code block. The method includes configuring an LDPC decoder in accordance with the predicted LDPC decoding result for the code block.

Other aspects provide: an apparatus operable, configured, or otherwise adapted to perform any one or more of the aforementioned methods and/or those described herein with reference to and as illustrated by the drawings and specification; a non-transitory, computer-readable medium comprising computer-executable instructions that, when executed by a processor of an apparatus, cause the apparatus to perform the aforementioned methods and/or those described herein with reference to and as illustrated by the drawings and specification; a computer program product embodied on a computer-readable storage medium comprising code for performing the aforementioned methods and/or those described herein with reference to and as illustrated by the drawings and specification; and/or an apparatus comprising means for performing the aforementioned methods and/or those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
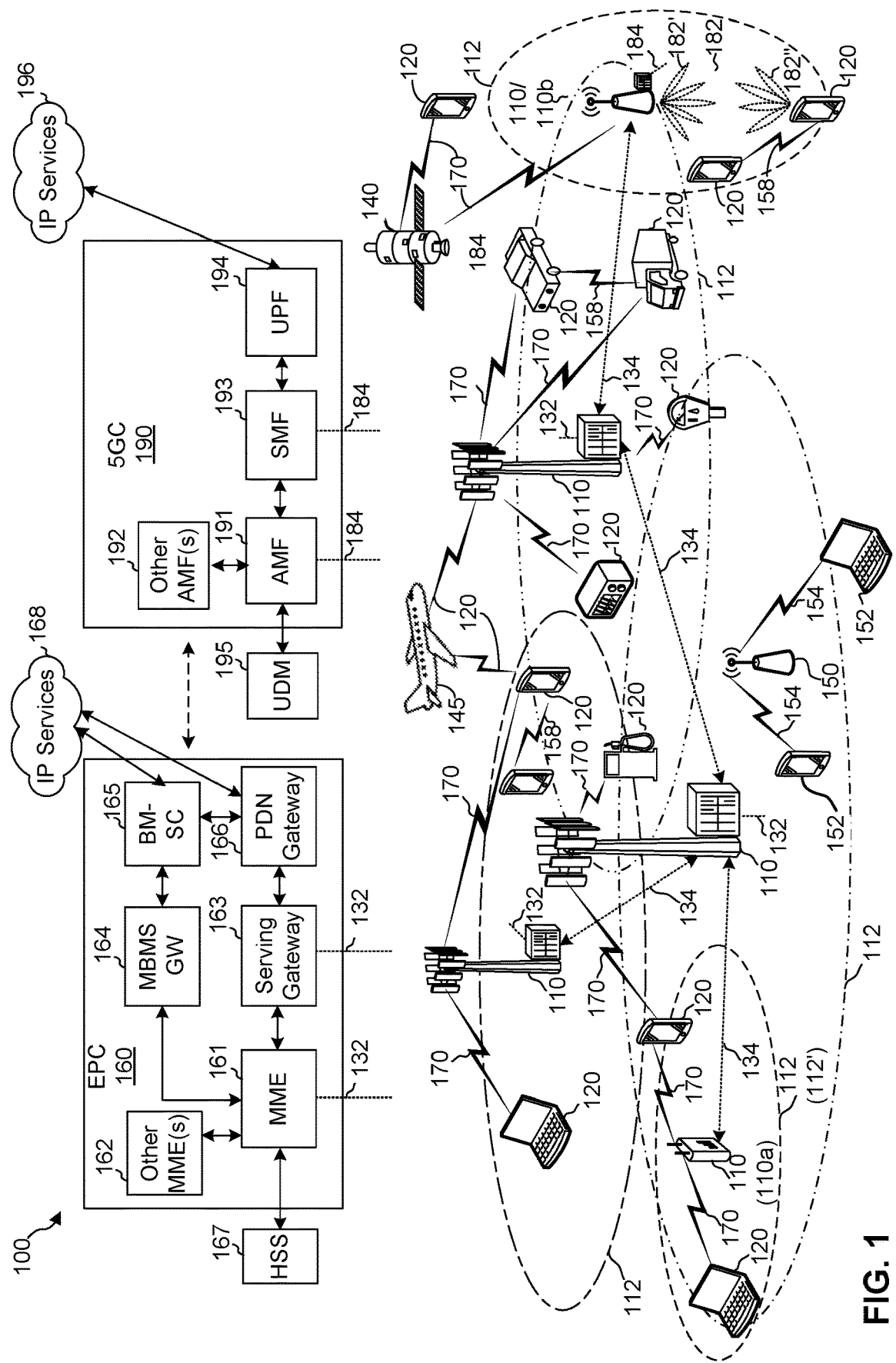
FIG. 1 is a diagram illustrating an example of a wireless network, in accordance with the present disclosure.

Aspects of the present disclosure provide apparatuses, methods, processing systems, and computer-readable mediums for power saving using predictions related to low density parity check (LDPC) decoding success.

In a wireless network, LDPC decoding is a technique that may be used in error correcting codes, particularly in contexts related to forward error correction (FEC). In particular, LDPC codes are a class of linear error-correcting codes that are defined by a sparse parity check matrix that is typically characterized by having a low density of entries with a value of 1, which is the basis for the name low density parity check. From a transmitter perspective, LDPC encoding is relatively straightforward, where the transmitter (or LDPC encoder) multiplies one or more message bits by a parity check matrix to generate a code block (or codeword). However, LDPC decoding is a more complex and iterative process designed to correct errors in received data. For example, LDPC decoding techniques generally use the parity check matrix and the received data to improve an estimate of the original message bits. LDPC decoding often uses a belief propagation algorithm, also known as a sum-product algorithm, which operates on a factor graph representation of the code block, where messages are iteratively exchanged between variable nodes (representing bits) and check nodes (representing parity-check equations). LDPC decoding is typically performed over multiple iterations, often referred to as decoding iterations, where each iteration involves variable nodes updating respective beliefs about the bit values based on received information from connected check nodes, and check nodes updating respective beliefs based on information from connected variable nodes. This process then continues for several iterations until LDPC decoding succeeds or fails (e.g., after a predefined number of iterations or when certain stopping criteria are met, such as all parity-check equations being satisfied or a bit error rate reaching an acceptable level).

In general, an important consideration in wireless networks (especially in millimeter wave and/or sub-terahertz frequency bands) is to reduce power consumption. For example, power savings is an important design goal for a user equipment (UE) as well as for network equipment to enable network energy savings. However, in cases where LDPC coding is used for a code block that is transmitted over a wireless channel (e.g., from a network node to a UE over an access link, from a UE to a network node over an access link, or from a first UE to a second UE over a sidelink), an LDPC decoder tends to be a component that consumes significant power in a baseband receiver, which is likely to become an increasingly prominent problem with growth in bandwidth (e.g., in bands such as FR4 and/or FR5 and/or 6G networks and beyond) leading to dramatically increased data rates. In general, because LDPC decoding is an iterative process, the power consumption associated with an LDPC decoder is linear with the number of LDPC decoding iterations. Accordingly, code blocks that are unsuccessfully decoded (e.g., fail to pass LDPC decoding) tend to consume more power than successfully decoded code blocks, because the maximum number of LDPC decoding iterations is attempted for unsuccessfully decoded code blocks (e.g., in contrast to successfully decoded code blocks, which usually need only a few LDPC decoding iterations, on average, for successful decoding). Furthermore, the power consumption of an LDPC decoder may be even higher in cases where there are a large number of retransmissions, such as a multiple incremental redundancy retransmission scheme (MIRS), where a high rate of unsuccessfully decoded code blocks is expected.

Some aspects described herein relate to techniques for predicting whether LDPC decoding will succeed or fail for a given code block, such that an LDPC decoder may be appropriately configured according to the predicted LDPC decoding result. For example, in some aspects, a wireless node that receives a code block encoded using LDPC techniques may obtain one or more statistics related to received log likelihood ratios (LLRs) associated with the code block, which may be defined in received LLR histogram information associated with the code block. For example, in LDPC decoding, received LLRs (e.g., LLRs associated with a received code block) serve an important role in the iterative LDPC decoding process, especially in the belief propagation algorithm, because the received LLRs represent the probability that a particular bit is a 1 versus the probability that a particular bit is a 0, given the received channel data. Accordingly, the statistics of the received LLRs and average mutual information associated with the received LLRs may provide useful indicators for predicting whether LDPC decoding will succeed or fail for a given code block, and such statistics may be available before LDPC decoding is attempted. Accordingly, in some aspects, a wireless node that receives an LDPC-encoded code block may use one or more techniques to predict an LDPC decoding result, prior to attempting LDPC decoding, such that LDPC decoding may be attempted only in cases where the LDPC decoding is predicted to succeed and/or avoided in cases where the LDPC decoding is predicted to fail. In this way, the wireless node may save power by avoiding attempting to decode one or more code blocks that are predicted to fail LDPC decoding.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
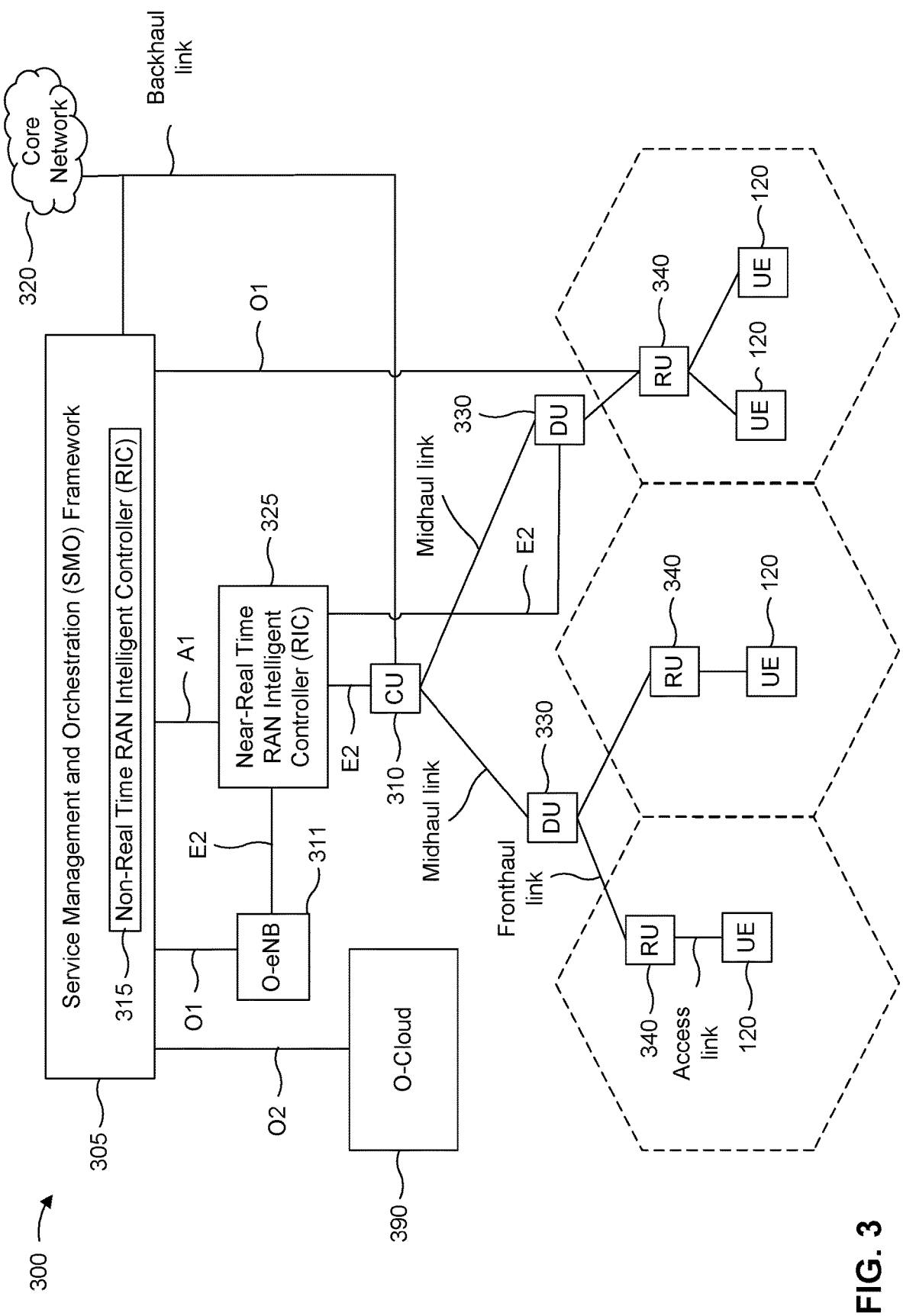
FIG. 3 is a diagram illustrating an example disaggregated base station architecture, in accordance with the present disclosure.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) radio access network (RAN) Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated RAN architecture, such as an Open RAN (O-RAN) architecture or a Virtualized RAN (vRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, the 3rd Generation Partnership Project (3GPP) currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless communications network 100 further includes a Wi-Fi access point 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
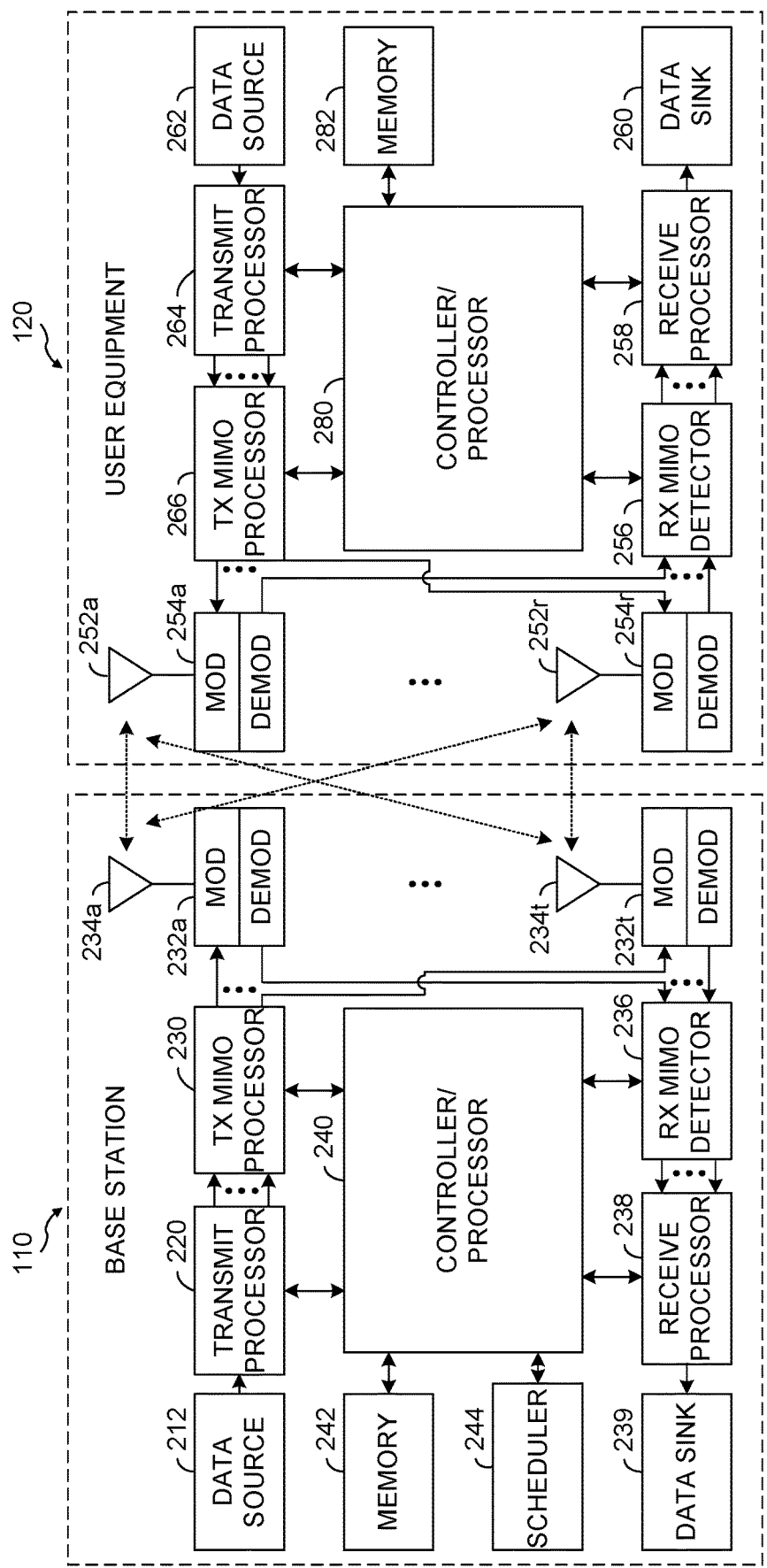
FIG. 2 is a diagram illustrating an example of a network node in communication with a user equipment (UE) in a wireless network, in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252a-r (collectively 252), transceivers 254a-r (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

UE 120 includes antennas 252a-252r that may receive the downlink signals from the BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

Receive (RX) MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 110.

At BS 110, the uplink signals from UE 120 may be received by antennas 234a-234t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data. In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an O-RAN (such as the network configuration sponsored by the O-RAN Alliance), or a vRAN (also known as a cloud RAN (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUS 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
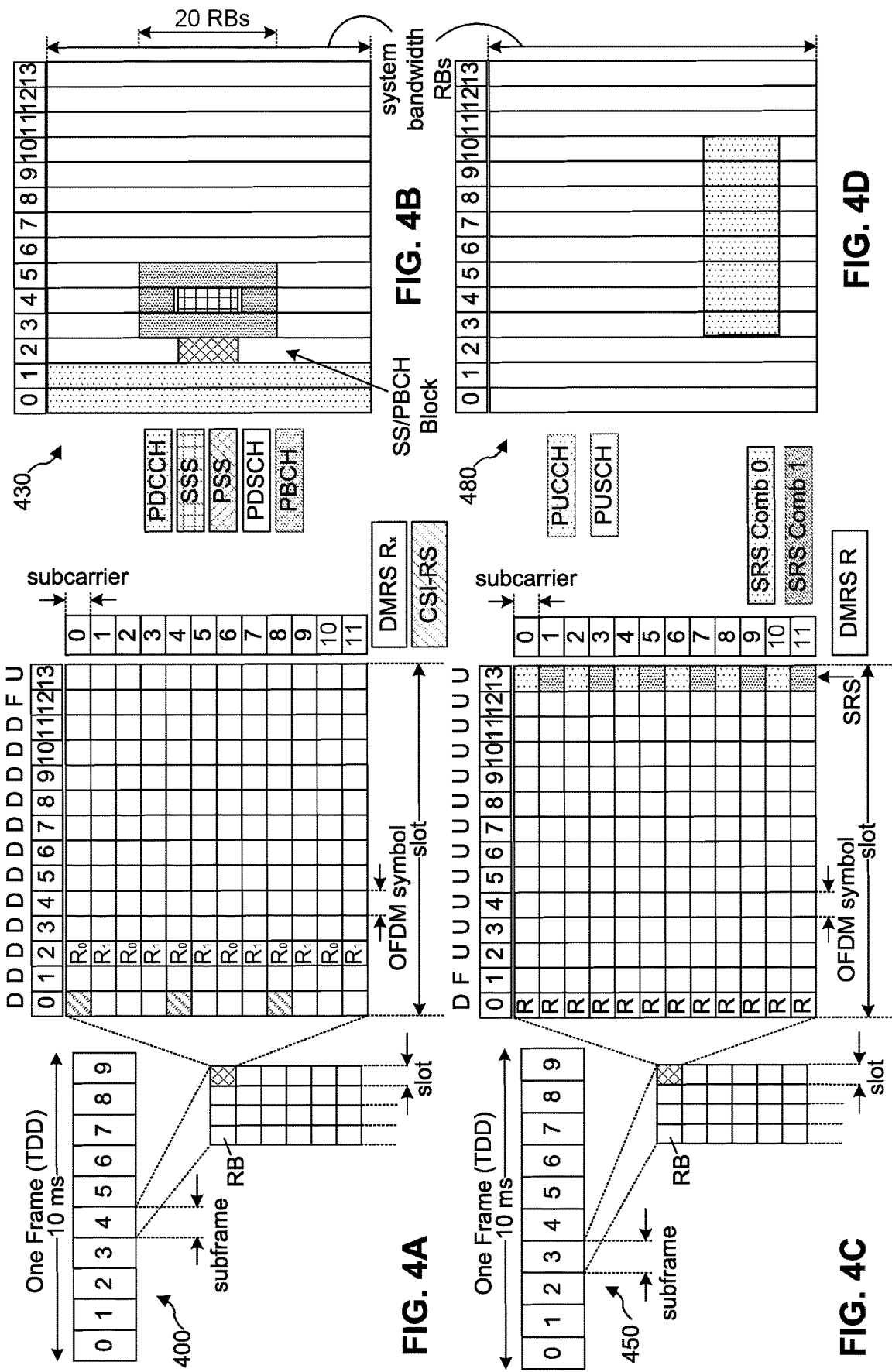
FIGS. 4A-4D depict aspects of data structures for a wireless communications network, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing. OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu \times 15$ kHz, where u is the numerology index, which may be selected from values 0 to 5. Accordingly, the numerology μ=0 has a subcarrier spacing of 15 kHz and the numerology μ=5 has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

An SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (also referred to as an SS block (SSB)). The MIB provides a number of RBs in the system bandwidth and a system frame number (SFN). The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
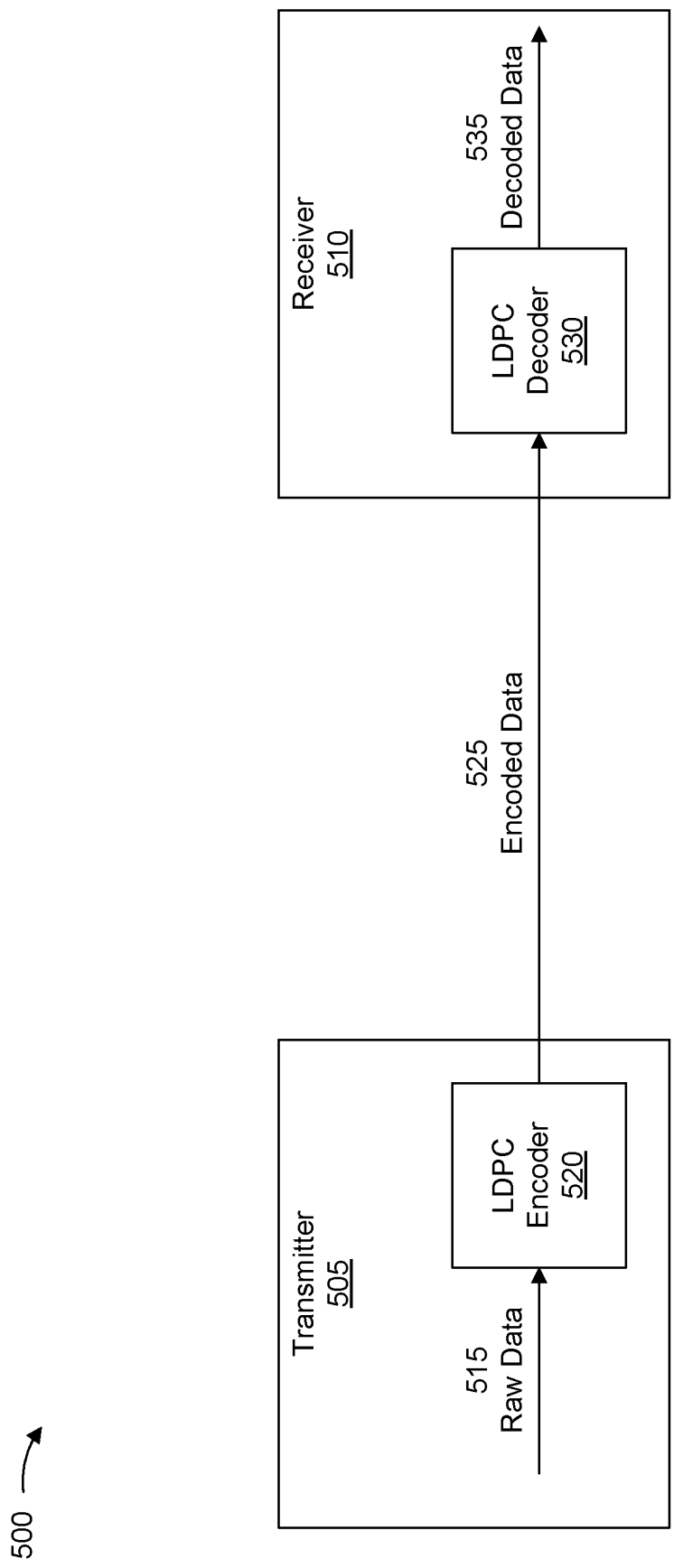
FIG. 5 is a diagram illustrating an example of a low density parity check (LDPC) coding procedure, in accordance with the present disclosure.

FIG. 5 is a diagram illustrating an example 500 of an LDPC coding procedure, in accordance with the present disclosure. As shown in FIG. 5, example 500 includes communication between a first wireless node, shown in FIG. 5 and referred to herein as transmitter 505, and a second wireless node, shown in FIG. 5 and referred to herein as receiver 510. In some aspects, the transmitter 505 may correspond to a network node 110 and the receiver 510 may correspond to a UE 120, or the transmitter 505 may correspond to a UE 120 and the receiver 510 may correspond to a network node 110, or the transmitter 505 may correspond to a first UE 120 and the receiver 510 may correspond to a second UE 120. In some aspects, the transmitter 505 and the receiver 510 may communicate in a wireless network, such as wireless network 100.

In some aspects, a communication from the transmitter 505 to the receiver 510 may be encoded based at least in part on an error correcting code (sometimes referred to as an error correcting scheme), such that the receiver 510 can determine whether the communication was properly transmitted (e.g., to verify that the communication was not corrupted by noise or the like) and/or so that the receiver 510 can correct any transmission errors using redundant bits provided by the error correcting code. One example of an error correcting code is an LDPC code. A communication may be encoded based at least in part on an LDPC code to provide for error detection at the receiver 510. Encoding for an LDPC may be performed based at least in part on a base graph (e.g., a sparse bipartite graph) that may identify a code word to be generated from an input data set and/or information to append to an input data set to form the LDPC.

More particularly, as shown in FIG. 5, the transmitter 505 may be in wireless communication with the receiver 510. When the transmitter 505 transmits data to the receiver 510, the transmitter 505 may first encode the data using an error correcting code, such as an LDPC code. More particularly, as shown by reference number 515, the transmitter 505 may process raw data to be transmitted to the receiver 510 by feeding the raw data through an LDPC encoder 520, among other signal processing components. The transmitter 505 may perform other signal processing operations (e.g., interleaving or the like), which are not shown in FIG. 5 for ease of description. The LDPC encoder 520 may add error correction bits to the raw data based at least in part on a selected base graph and/or based at least in part on a target code rate, forming a stream of encoded data, as shown by reference number 525. In some aspects, "code rate" may refer to a number of raw data bits divided by a total number of bits in an encoded data stream (e.g., the code rate is the proportion of the data stream that is useful, or non-redundant), and thus LDPC coding or similar processes associated with a lower code rate provide more error protection, but require additional overhead, than LDPC coding or similar processes associated with a higher code rate. The encoded data may be transmitted by the transmitter 505 to the receiver 510 using a RAN or the like, where the encoded data is fed through an LDPC decoder 530 (and, in some aspects, other signal processing components such as a deinterleaver, or the like) in order to extract the raw data therefrom, as shown by reference number 535.

Although error correction coding processes, such as LDPC coding, may beneficially protect data streams and result in reduced communication error rates, such processes may be associated with large overhead due to the addition of error correction bits to the raw data stream, and/or require relatively high power consumption at the transmitter 505 and the receiver to encode and decode the raw data. For example, in some instances, decoding a channel with an LDPC decoder at the receiver 510 may constitute the greatest power-consuming operation in the digital chain (e.g., in some cases representing greater than 60% of the power consumption used by a modem associated with the receiver 510). Error correction coding processes, such as LDPC coding, may consume even more power when implemented for high-frequency communications, such as communications in the millimeter wave (e.g., FR2) bands and/or communications in sub-terahertz bands, such as FR4 and beyond. Such high-frequency communications may be associated with relatively large bandwidths and high data/bit rates, leading to high power consumption associated with LDPC decoding processes or the like. For example, for certain sub-terahertz communications, LDPC power consumption may approach 90% of the overall power consumption by the modem associated with the receiver 510. Thus, a transmitter 505 and a receiver 510 may either forgo LDPC coding and similar error correction coding in order to reduce power consumption, leading to increased transmission error rates and thus unreliable communications, or else employ LDPC coding or a similar error correction coding scheme at a cost of high power consumption and large overhead.

Some aspects described herein relate to techniques for predicting whether LDPC decoding will succeed or fail for a given code block, such that an LDPC decoder may be appropriately configured according to the predicted LDPC decoding result. For example, in some aspects, a wireless node that receives a code block encoded using LDPC techniques may obtain one or more statistics related to received log likelihood ratios (LLRs) associated with the code block, which may be defined in received LLR histogram information associated with the code block. For example, in LDPC decoding, received LLRs (e.g., LLRs associated with a received code block) serve an important role in the iterative LDPC decoding process, especially in the belief propagation algorithm or a simplified version of the belief propagation algorithm (e.g., a min-sum algorithm, a normalized min-sum algorithm, an offset min-sum algorithm, or a self-corrected min-sum algorithm) that may be used for complexity reduction in some cases. For example, as described herein, the received LLRs serve an important role in the iterative LDPC decoding process because the received LLRs represent the probability that a particular bit is a 1 versus the probability that a particular bit is a 0, given the received channel data. Accordingly, the statistics of the received LLRs and average mutual information associated with the received LLRs may provide useful indicators for predicting whether LDPC decoding will succeed or fail for a given code block, and such statistics may be available before LDPC decoding is attempted. Accordingly, in some aspects, a wireless node that receives an LDPC-encoded code block may use one or more techniques to predict an LDPC decoding result, prior to attempting LDPC decoding, such that LDPC decoding may be attempted only in cases where the LDPC decoding is predicted to succeed and/or avoided in cases where the LDPC decoding is predicted to fail. In this way, the wireless node may save power by avoiding attempting to decode one or more code blocks that are predicted to fail LDPC decoding.

As indicated above, FIG. 5 is provided as an example. Other examples may differ from what is described with regard to FIG. 5.

Figure 6A:
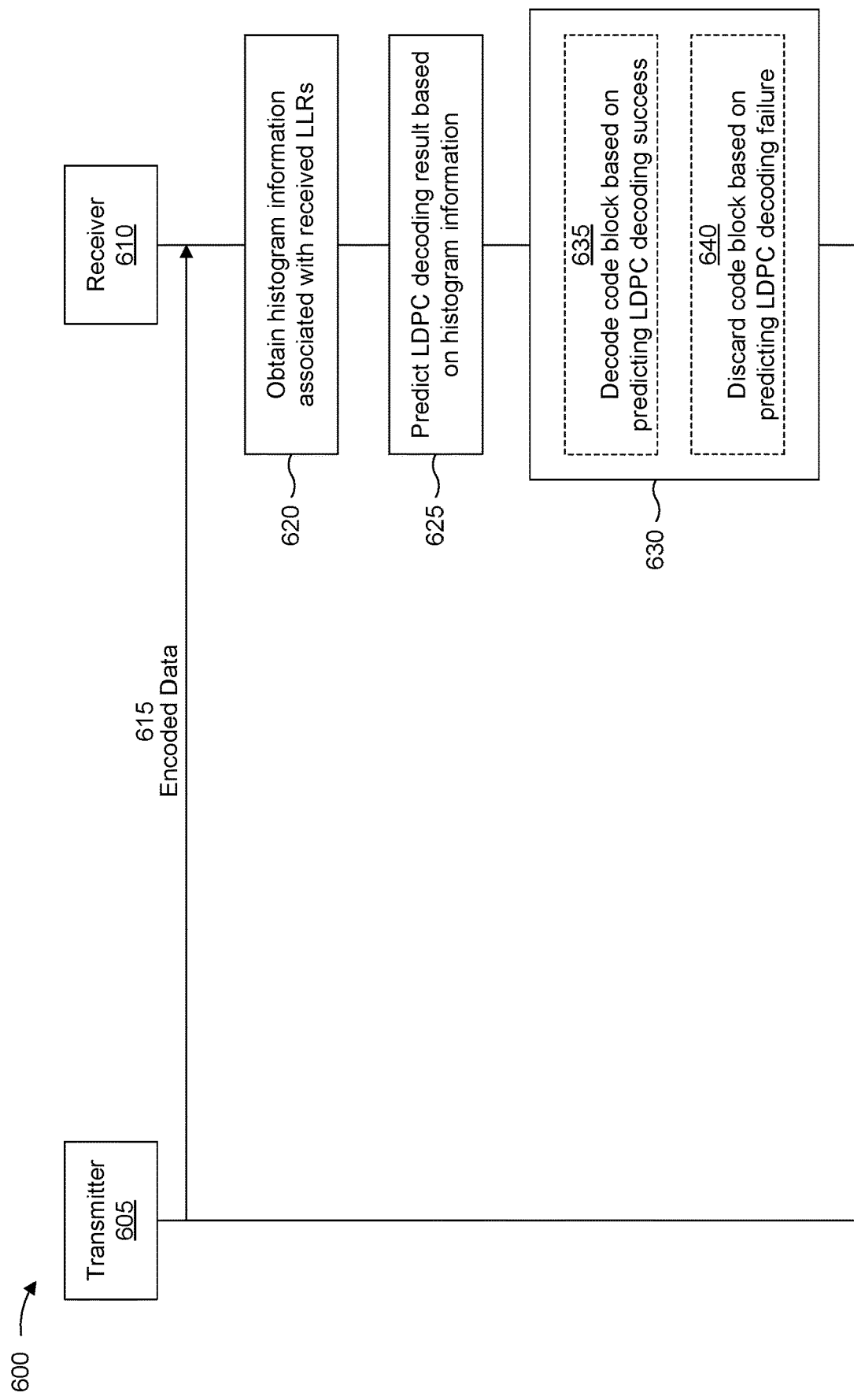
FIGS. 6A-6B are diagrams illustrating examples associated with power saving using predictions related to LDPC decoding success, in accordance with the present disclosure.
Figure 6B:
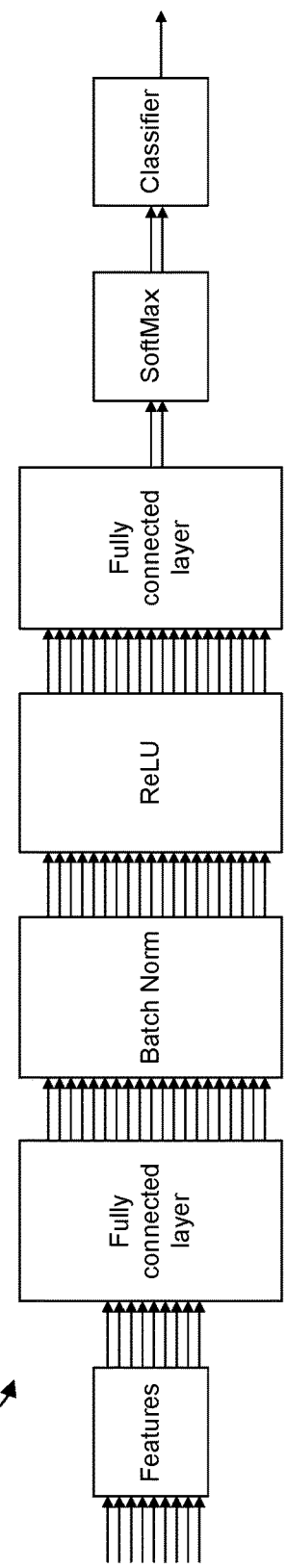

FIGS. 6A-6B are diagrams illustrating examples 600 associated with power saving using predictions related to LDPC decoding success, in accordance with the present disclosure. As shown in FIG. 6A, examples 600 include communication between a first wireless node, shown in FIG. 6A and referred to herein as transmitter 605, and a second wireless node, shown in FIG. 6A and referred to herein as receiver 610. In some aspects, the transmitter 605 may correspond to a network node 110 and the receiver 610 may correspond to a UE 120, or the transmitter 605 may correspond to a UE 120 and the receiver 610 may correspond to a network node 110, or the transmitter 605 may correspond to a first UE 120 and the receiver 610 may correspond to a second UE 120. In some aspects, the transmitter 605 and the receiver 610 may communicate in a wireless network, such as wireless network 100.

As shown in FIG. 6A, and by reference number 615, the transmitter 605 may transmit, and the receiver 610 may receive, a code block that includes data encoded using LDPC encoding techniques. For example, as described herein, when the transmitter 605 transmits data to the receiver 610, the transmitter 605 may first encode the data using an error correcting code, such as an LDPC code. More particularly, the transmitter 605 may process raw data to be transmitted to the receiver 610 by feeding the raw data through an LDPC encoder 520, among other signal processing components. The transmitter 605 may perform other signal processing operations (e.g., interleaving or the like), which are not shown in FIG. 6A for ease of description. The LDPC encoder may add error correction bits to the raw data based at least in part on a selected base graph and/or based at least in part on a target code rate, forming a stream of encoded data. For example, at the transmitter 605, the LDPC encoder may be used to multiply the message bits to be transmitted to the receiver 610 by a generation matrix (e.g., usually denoted G) to generate the encoded code block that is then transmitted to the receiver 610.

As further shown in FIG. 6A, and by reference number 620, the receiver 610 may obtain histogram information associated with received LLRs associated with the code block. For example, in LDPC decoding, LLRs serve an important role in the iterative LDPC decoding process, particularly in the belief propagation algorithm. In particular, LLRs generally represent a probability that a bit is a 1 versus a probability that the bit is a 0, given the received channel data. Accordingly, in an initial stage of LDPC decoding, LLRs may be calculated based on the received channel data and the noise characteristics of the communication channel, where the initial LLR calculation may involve computing a likelihood of the received bits based on the channel model and a signal-to-noise ratio (SNR). For example, to calculate the LLRs, the receiver 610 may apply an entire demodulator flow, which may include timing offset estimation, frequency offset estimation, channel estimation, noise and interference estimation, and demodulation, and an output from the demodulator may include the LLRs. Furthermore, during the iterative decoding process, LLRs are exchanged between variable nodes and check nodes at the receiver 610, where variable nodes use the received LLRs to calculate the likelihood that a particular bit is a 0 or a 1, given the received LLRs from neighboring check nodes, and the updated LLRs are then passed to the check nodes. Furthermore, check nodes may use the received LLRs from connected variable nodes to update their own values, representing the reliability of parity-check equations, which are used to compute the probabilities of the transmitted codeword being correct, given the received data. In a typical LDPC decoding process, after check nodes process the LLRs, the updated LLRs are then sent back to the corresponding variable nodes, which then utilize the updated LLRs to refine their beliefs about the bit values and update their own LLRs accordingly. Furthermore, LDPC decoding with received LLRs is often referred to as soft-decision decoding because LLRs provide a more nuanced representation of the received data as compared to hard-decision decoding, which relies solely on 0s and 1s. LLRs are also used in multiple iterations of the LDPC decoding process to improve the estimation of the transmitted code block, as the iterative nature of LDPC decoding allows for the refinement of LLRs, which can lead to a more accurate estimate of the original transmitted data. Accordingly, the information provided by LLRs can be used in the iterative decoding process to effectively handle the noise and errors present in received data, leading to improved error correction performance and increased reliability.

Accordingly, as described herein, the receiver 610 may obtain the histogram information associated with the received LLRs to obtain one or more statistics that can then be used to predict whether LDPC decoding will succeed or fail. For example, in some aspects, the received LLR histogram information may contain more information than average mutual information of the received LLRs, which provide a relatively simplified LDPC success predictor, that can be exploited to better predict whether a code block is likely to pass a cyclic redundancy check (CRC). For example, in probability and/or information theory, the mutual information of two random variables is a metric that represents the mutual dependence between the two variables (e.g., quantifying the amount of information obtained about one random variable by observing the other random variable). For example, the LLR is generally used as an input to an LDPC decoder, where the LLR carries information about the probability that the (soft) received bit has a value of 0 and/or the probability that the (soft) received bit has a value of 1 in a log domain. For example, if the LLR equals 0, there is a 50% probability of the bit being a 0 and a 50% probability of the bit being a 1, which means that the LLR does not carry any useful information, whereby the mutual information for the LLR in this case is 0. In another example, however, the LLR may be very high in absolute value (e.g., a positive value of 10 or 20 representing a high probability that the bit is a 0, or a negative value of 10 or 20 representing a high probability that the bit is a 1), and the LLR may indicate a 99.99% or similar value of the bit being a 1 and a 0.01% of the bit being a 0 (or vice versa), in which case the LLR indicates significant information and carries almost all of the information about the bit. For example, the LLR and the corresponding mutual information may indicate to a near certainty that the bit equals to a logical one or zero, in which case mutual information (or the amount of information) between the transmitter 605 and the receiver 610 is very high.

Accordingly, as shown by reference number 625, the received LLR histogram information, the average mutual information of the received LLRs associated with the received code block, and/or other suitable statistics or metrics related to the received code block may provide useful indicators for predicting whether LDPC decoding will succeed or fail for a given code block, prior to even attempting LDPC decoding for the code block. For example, in some aspects, the receiver 610 may obtain M bins of the histogram information of the received LLRs associated with the code block (e.g., corresponding to absolute values of the LLRs), which may be linearly spaced in the LLR domain and/or the mutual information domain. Furthermore, referring to FIG. 6B, reference number 645 indicates a set of equations that may be used to calculate numerical mutual information based on a received LLR value.

In particular, in the set of equations shown in FIG. 6B, $x_k$ represents a transmitted bit (e.g., the value of bit k at the transmitter 605), y represents the received signal at the receiver 610, whereby $LLR_k$ is a log of the ratio between the probability of the transmitted bit being equal to 0 given the received signal (e.g., given y) divided by the probability of the transmitted bit being 1 given y. As further shown in FIG. 6B, from the formulas for deriving the LLR, the probability of the bit being 0 can be derived based on e to the power of $LLR_k$ over 1+e to the power of $LLR_k$ and the probability of the bit being 1 can be derived based on 1 over 1+e to the power of $LLR_k$, and from such probabilities the receiver 610 can calculate the average mutual information, $I(x_k; y)$. In this way, the receiver 610 can derive one or more metrics or statistics, based on the received LLR histogram information, to predict whether LDPC decoding is more likely to succeed or fail.

In some aspects, referring again to FIG. 6A, and to reference number 625, the receiver 610 may predict an LDPC decoding result for the code block based on the histogram information associated with the received LLRs. For example, in some aspects, the receiver 610 may use a neural network to predict whether LDPC decoding is likely to succeed or fail based on one or more neural network inputs. For example, in some aspects, the inputs to the neural network may include M bins of the histogram information associated with the received LLRs of the received block (e.g., absolute values of the received LLRs), where the M bins may be linearly spaced in the LLR domain and/or the mutual information domain. Additionally, or alternatively, in some cases, the inputs to the neural network may include the average mutual information of the received LLRs associated with the code block, although the average mutual information may be redundant or unnecessary in cases where a histogram with a high resolution is obtained. In some aspects, the neural network may then generate, for each code block, an output that indicates whether the code block is likely to pass or fail LDPC decoding based on the input(s) provided to the neural network.

For example, referring to FIG. 6B, reference number 650 indicates an example neural network that may be used to predict an LDPC decoding result for a given code block. As shown, the neural network may be based on a case where the histogram information of the received LLRs includes 8 histogram bins (e.g., M=8) that are linearly spaced in the mutual information domain. Furthermore, in the example shown in FIG. 6B, the inputs to the neural network include the average mutual information parameter, whereby there are 9 neural network inputs. In this case, the neural network includes a features layer to receive the 9 neural network inputs, a first connected layer to connect 9 input neurons to 20 output neurons, a batch normalization layer, a rectified linear unit (ReLU) layer, a second connected layer to connect 20 input neurons to 2 output neurons, a SoftMax layer that implements a softmax activation function, and a classifier layer that produces an output indicating whether LDPC decoding is more likely to pass or fail for the input code block. In general, the neural network shown in FIG. 6B may provide a low power consumption component for predicting whether LDPC decoding is likely to succeed or fail, relative to the LDPC decoder, which may result in power savings for code blocks that are likely to fail LDPC decoding. However, the neural network shown in FIG. 6B is an example only, and other suitable neural networks may be used to generate the prediction of whether LDPC decoding will succeed or fail for a given code block.

Additionally, or alternatively, rather than using a neural network predictor, the receiver 610 may use one or more threshold functions to predict whether LDPC decoding will succeed or fail for a given code block based on the received LLR histogram information. For example, in some aspects, the receiver 610 may obtain one or more statistics that include the average mutual information associated with a code block, the summation of one or more histogram bins, and/or a ratio or multiplication metric between one or more histogram bins. In some aspects, in cases where the receiver 610 uses the one or more threshold functions, the receiver 610 may predict that the code block will pass a CRC (e.g., result in LDPC decoding success) in cases where the average mutual information satisfies (e.g., equals or exceeds) a first threshold. Alternatively, in cases where the average mutual information fails to satisfy (e.g., fails to equal or exceed) the first threshold, the receiver 610 may predict that the code block will pass the CRC (e.g., result in LDPC decoding success) in cases where the average mutual information satisfies (e.g., equals or exceeds) a second threshold that is less than the first threshold and the summation of one or more histogram bins satisfies a third threshold. Alternatively, in cases where the average mutual information fails to satisfy the second threshold and/or the summation of one or more histogram bins fails to satisfy the third threshold, the receiver 610 may predict that the code block will pass the CRC (e.g., result in LDPC decoding success) in cases where the average mutual information satisfies (e.g., equals or exceeds) a fourth threshold that is less than the first and second thresholds and the ratio/multiplication between one or more histogram bins satisfies a fifth threshold.

Accordingly, as shown in FIG. 6A, and by reference number 630, the receiver 610 may configure an LDPC decoder in accordance with the predicted LDPC decoding result for a given code block. For example, as shown by reference number 635, the receiver 610 may decode the code block in cases where the predicted LDPC decoding result is that LDPC decoding will succeed for the code block. On the other hand, as shown by reference number 640, the receiver 610 may discard the code block and refrain from attempting to decode the code block in cases where the predicted LDPC decoding result is that LDPC decoding will fail for the code block, thereby conserving power when the iterative LDPC decoding process is likely to fail.

As indicated above, FIGS. 6A-6B are provided as examples. Other examples may differ from what is described with regard to FIGS. 6A-6B.

Figure 7:
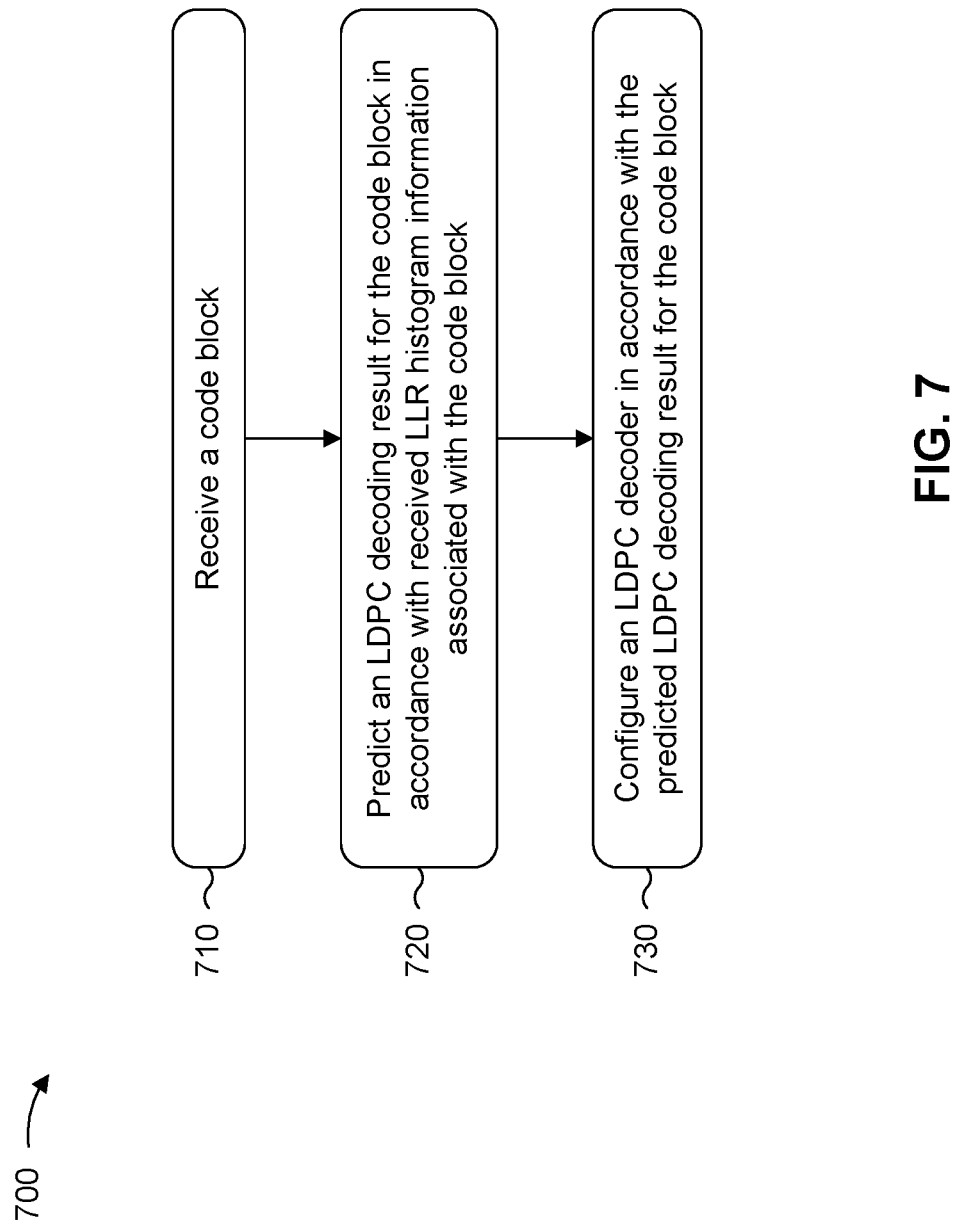
FIG. 7 is a diagram illustrating an example process associated with power saving using predictions related to LDPC decoding success, in accordance with the present disclosure.

FIG. 7 is a flowchart of an example method 700 of wireless communication. The method 700 may be performed at, for example, a wireless node (e.g., receiver 510, receiver 610, or the like) or an apparatus of a wireless node.

Method 700 begins at 710 with receiving a code block. For example, the wireless node may receive a code block, as described above in connection with, for example, FIG. 6A at 615.

Method 700 then proceeds at 720 with predicting an LDPC decoding result for the code block in accordance with received LLR histogram information associated with the code block. For example, the wireless node may predict an LDPC decoding result for the code block in accordance with received LLR histogram information associated with the code block, as described above in connection with, for example, FIG. 6A at 625.

Method 700 then proceeds at 730 with configuring an LDPC decoder in accordance with the predicted LDPC decoding result for the code block. For example, the wireless node may configure an LDPC decoder in accordance with the predicted LDPC decoding result for the code block, as described above in connection with, for example, FIG. 6A at 630, 635, and 640.

In some aspects, configuring the LDPC decoder includes configuring the LDPC decoder to attempt to decode the code block responsive to the predicted LDPC decoding result indicating that LDPC decoding will be successful.

In some aspects, configuring the LDPC decoder includes configuring the LDPC decoder to refrain from decoding the code block responsive to the predicted LDPC decoding result indicating that LDPC decoding will be unsuccessful.

In some aspects, predicting the LDPC decoding result includes obtaining, from the received LLR histogram information, one or more neural network inputs, and providing the one or more neural network inputs to a neural network that uses one or more machine learning techniques to generate the LDPC decoding result.

In some aspects, the one or more neural network inputs include a plurality of bins associated with the received LLR histogram information.

In some aspects, the plurality of bins associated with the received LLR histogram information are linearly spaced in an LLR domain.

In some aspects, the plurality of bins associated with the received LLR histogram information are linearly spaced in a mutual information domain.

In some aspects, the one or more neural network inputs include an average mutual information metric associated with the received LLR histogram information.

In some aspects, predicting the LDPC decoding result includes predicting that the LDPC decoder will successfully decode the code block responsive to the received LLR histogram information indicating an average mutual information metric that satisfies a threshold.

In some aspects, predicting the LDPC decoding result includes predicting that the LDPC decoder will successfully decode the code block responsive to the received LLR histogram information indicating an average mutual information metric that satisfies a first threshold and a summation metric associated with one or more histogram bins that satisfies a second threshold.

In some aspects, predicting the LDPC decoding result includes predicting that the LDPC decoder will successfully decode the code block responsive to the received LLR histogram information indicating an average mutual information metric that satisfies a first threshold and a ratio or multiplication metric associated with one or more histogram bins that satisfies a second threshold.

In some aspects, predicting the LDPC decoding result includes predicting that the LDPC decoder will fail to successfully decode the code block responsive to the received LLR histogram information indicating an average mutual information metric that fails to satisfy a first threshold and one or more of a summation metric, a ratio metric, or a multiplication metric associated with one or more histogram bins that fails to satisfy a second threshold.

Figure 8:
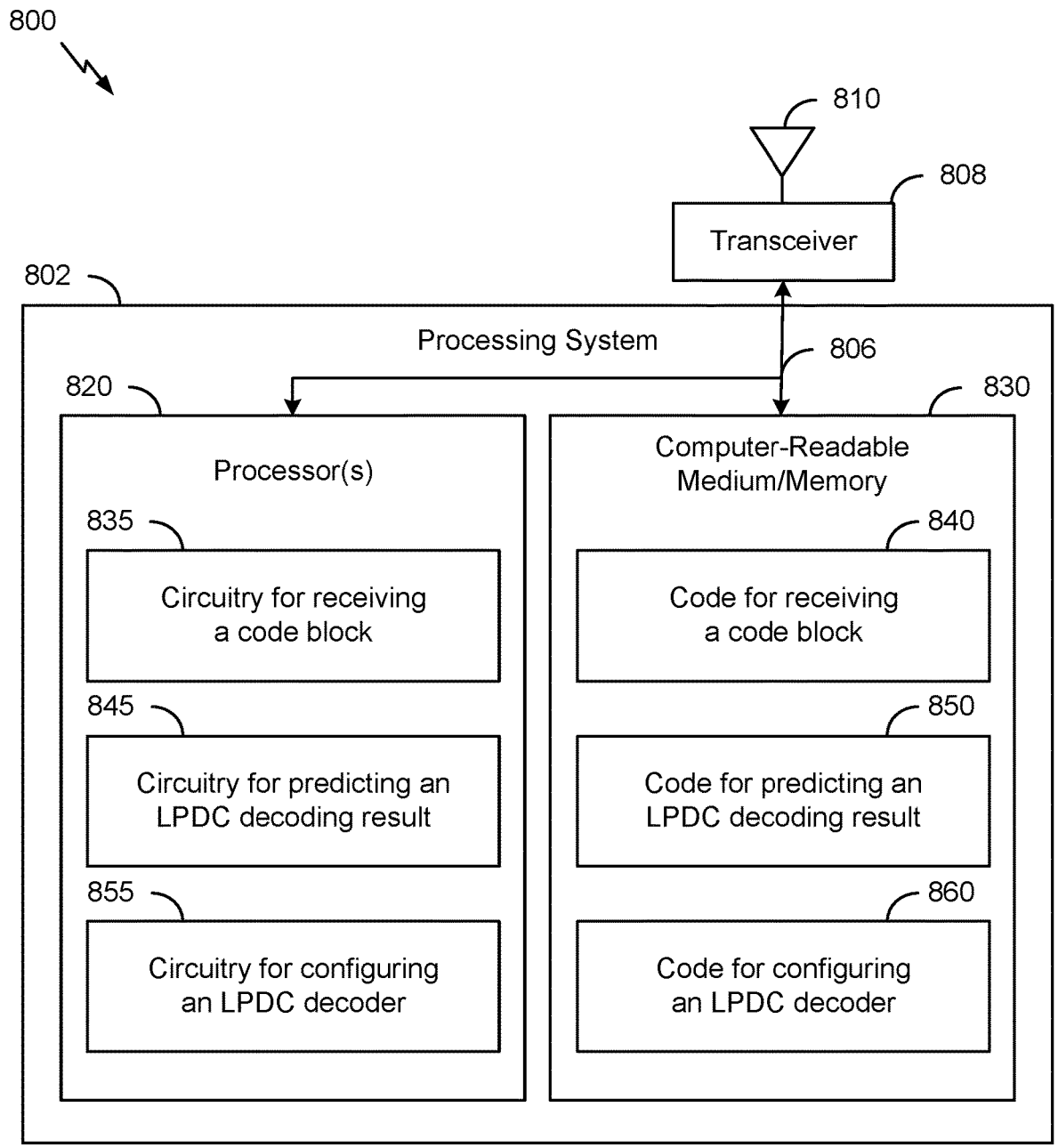
FIG. 8 is a diagram illustrating an example of an implementation of code and circuitry for a communications device, in accordance with the present disclosure.

In one aspect, method 700, or any aspect related to it, may be performed by an apparatus, such as communications device 800 of FIG. 8, which includes various components operable, configured, or adapted to perform the method 700. Communications device 800 is described below in further detail.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

FIG. 8 is a diagram illustrating an example of an implementation of code and circuitry for a communications device 800, in accordance with the present disclosure. The communications device 800 may be a wireless node, such as receiver 510 or receiver 610, or a wireless node may include the communications device 800.

The communications device 800 includes a processing system 802 coupled to a transceiver 808 (e.g., a transmitter and/or a receiver, and which may include a single transceivers or multiple transceivers which may perform different operations described as being performed by the transceiver 808). The transceiver 808 is configured to transmit and receive signals for the communications device 800 via an antenna 810, such as the various signals as described herein.

The processing system 802 may be configured to perform processing functions for the communications device 800, including processing signals received and/or to be transmitted by the communications device 800.

The processing system 802 includes one or more processors 820. In various aspects, the one or more processors 820 may include one or more of receive processor 238/258, transmit processor 220/264, TX MIMO processor 230/266, and/or controller/processor 240/280, as described with respect to FIG. 2. The one or more processors 820 are coupled to a computer-readable medium/memory 830 via a bus 806. In various aspects, the computer-readable medium/memory 830 may include one or more memories such as memory 242/282, as described with respect to FIG. 2. In certain aspects, the computer-readable medium/memory 830 is configured to store instructions (e.g., computer-executable code, processor-executable code) that when executed by the one or more processors 820, cause the one or more processors 820 to perform the method 700 described with respect to FIG. 7, or any aspect related to them. Note that reference to a processor performing a function of communications device 800 may include one or more processors performing that function of communications device 800. Note also that reference to one or more processors performing multiple functions may include a first processor performing a first function of the multiple functions and a second processor performing a second function of the multiple functions.

As shown in FIG. 8, the communications device 800 may include circuitry for receiving a code block (circuitry 835).

As shown in FIG. 8, the communications device 800 may include, stored in computer-readable medium/memory 830, code for receiving a code block (code 840).

As shown in FIG. 8, the communications device 800 may include circuitry for predicting an LDPC decoding result for the code block in accordance with received LLR histogram information associated with the code block (circuitry 845).

As shown in FIG. 8, the communications device 800 may include, stored in computer-readable medium/memory 830, code for predicting an LDPC decoding result for the code block in accordance with received LLR histogram information associated with the code block (code 850).

As shown in FIG. 8, the communications device 800 may include circuitry for configuring an LDPC decoder in accordance with the predicted LDPC decoding result for the code block (circuitry 855).

As shown in FIG. 8, the communications device 800 may include, stored in computer-readable medium/memory 830, code for configuring an LDPC decoder in accordance with the predicted LDPC decoding result for the code block (code 860).

Various components of the communications device 800 may provide means for performing the method 700 described with respect to FIG. 7, or any aspect related to it. For example, means for transmitting, sending, or outputting for transmission may include the transceiver(s) 254 and/or antenna(s) 252 of the UE 120 in FIG. 2, the transceiver(s) 232 and/or antenna(s) 234 of the BS 110 in FIG. 2, and/or the transceiver 808 and/or antenna 810 of the communications device 800 in FIG. 8. Means for receiving or obtaining may include the transceiver(s) 254 and/or antenna(s) 252 of the UE 120 in FIG. 2, the transceiver(s) 232 and/or antenna (s) 234 of the BS 110 in FIG. 2, and/or the transceiver 808 and/or antenna 810 of the communications device 800 in FIG. 8.

FIG. 8 is provided as an example. Other examples may differ from what is described in connection with FIG. 8.

The following provides an overview of some Aspects of the present disclosure:

Aspect 1: A method of wireless communication performed by a wireless node, comprising: receiving a code block; predicting an LDPC decoding result for the code block in accordance with received LLR histogram information associated with the code block; and configuring an LDPC decoder in accordance with the predicted LDPC decoding result for the code block.

Aspect 2: The method of Aspect 1, wherein configuring the LDPC decoder includes: configuring the LDPC decoder to attempt to decode the code block responsive to the predicted LDPC decoding result indicating that LDPC decoding will be successful.

Aspect 3: The method of any of Aspects 1-2, wherein configuring the LDPC decoder includes: configuring the LDPC decoder to refrain from decoding the code block responsive to the predicted LDPC decoding result indicating that LDPC decoding will be unsuccessful.

Aspect 4: The method of any of Aspects 1-3, wherein predicting the LDPC decoding result includes: obtaining, from the received LLR histogram information, one or more neural network inputs; and providing the one or more neural network inputs to a neural network that uses one or more machine learning techniques to generate the LDPC decoding result.

Aspect 5: The method of Aspect 4, wherein the one or more neural network inputs include a plurality of bins associated with the received LLR histogram information.

Aspect 6: The method of Aspect 5, wherein the plurality of bins associated with the received LLR histogram information are linearly spaced in an LLR domain.

Aspect 7: The method of Aspect 5, wherein the plurality of bins associated with the received LLR histogram information are linearly spaced in a mutual information domain.

Aspect 8: The method of Aspect 4, wherein the one or more neural network inputs include an average mutual information metric associated with the received LLR histogram information.

Aspect 9: The method of any of Aspects 1-8, wherein predicting the LDPC decoding result includes: predicting that the LDPC decoder will successfully decode the code block responsive to the received LLR histogram information indicating an average mutual information metric that satisfies a threshold.

Aspect 10: The method of any of Aspects 1-9, wherein predicting the LDPC decoding result includes: predicting that the LDPC decoder will successfully decode the code block responsive to the received LLR histogram information indicating an average mutual information metric that satisfies a first threshold and a summation metric associated with one or more histogram bins that satisfies a second threshold.

Aspect 11: The method of any of Aspects 1-10, wherein predicting the LDPC decoding result includes: predicting that the LDPC decoder will successfully decode the code block responsive to the received LLR histogram information indicating an average mutual information metric that satisfies a first threshold and a ratio or multiplication metric associated with one or more histogram bins that satisfies a second threshold.

Aspect 12: The method of any of Aspects 1-11, wherein predicting the LDPC decoding result includes: predicting that the LDPC decoder will fail to successfully decode the code block responsive to the received LLR histogram information indicating an average mutual information metric that fails to satisfy a first threshold and one or more of a summation metric, a ratio metric, or a multiplication metric associated with one or more histogram bins that fails to satisfy a second threshold.

Aspect 13: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-12.

Aspect 14: An apparatus for wireless communication at a device, the apparatus comprising one or more memories and one or more processors coupled to the one or more memories, the one or more processors configured to cause the device to perform the method of one or more of Aspects 1-12.

Aspect 15: An apparatus for wireless communication, the apparatus comprising at least one means for performing the method of one or more of Aspects 1-12.

Aspect 16: A non-transitory computer-readable medium storing code for wireless communication, the code comprising instructions executable by one or more processors to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

Aspect 18: A device for wireless communication, the device comprising a processing system that includes one or more processors and one or more memories coupled with the one or more processors, the processing system configured to cause the device to perform the method of one or more of Aspects 1-12.

Aspect 19: An apparatus for wireless communication at a device, the apparatus comprising one or more memories and one or more processors coupled to the one or more memories, the one or more processors individually or collectively configured to cause the device to perform the method of one or more of Aspects 1-12.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

Reference to an element in the singular is not intended to mean only one unless specifically so stated, but rather "one or more." For example, reference to an element (e.g., "a processor," "a controller," "a memory," etc.), unless otherwise specifically stated, should be understood to refer to one or more elements (e.g., "one or more processors," "one or more controllers," "one or more memories," etc.).

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of wireless communication performed by a wireless node, comprising:
   receiving a signal comprising a code block;
   predicting a low density parity check (LDPC) decoding result for the code block in accordance with received log likelihood ratio (LLR) histogram information associated with the code block, the LDPC decoding result indicating whether the code block will pass a cyclic redundancy check (CRC); and
   configuring an LDPC decoder in accordance with the predicted LDPC decoding result for the code block.

2. The method of claim 1,
   wherein configuring the LDPC decoder includes:
   configuring the LDPC decoder to attempt to decode the code block responsive to the predicted LDPC decoding result indicating that LDPC decoding will be successful.

3. The method of claim 1,
   wherein configuring the LDPC decoder includes:
   configuring the LDPC decoder to refrain from decoding the code block responsive to the predicted LDPC decoding result indicating that LDPC decoding will be unsuccessful.

4. The method of claim 1,
   wherein predicting the LDPC decoding result includes:
   obtaining, from the received LLR histogram information, one or more neural network inputs; and
   providing the one or more neural network inputs to a neural network that uses one or more machine learning techniques to generate the LDPC decoding result.

5. The method of claim 4,
   wherein the one or more neural network inputs include a plurality of bins associated with the received LLR histogram information.

6. The method of claim 5,
   wherein the plurality of bins associated with the received LLR histogram information are linearly spaced in an LLR domain.

7. The method of claim 5,
   wherein the plurality of bins associated with the received LLR histogram information are linearly spaced in a mutual information domain.

8. The method of claim 4,
   wherein the one or more neural network inputs include an average mutual information metric associated with the received LLR histogram information.

9. The method of claim 1,
   wherein predicting the LDPC decoding result includes:
   predicting that the LDPC decoder will successfully decode the code block responsive to the received LLR histogram information indicating an average mutual information metric that satisfies a threshold.

10. The method of claim 1,
wherein predicting the LDPC decoding result includes:
predicting that the LDPC decoder will successfully decode the code block responsive to the received LLR histogram information indicating an average mutual information metric that satisfies a first threshold and a summation metric associated with one or more histogram bins that satisfies a second threshold.

11. The method of claim 1,
wherein predicting the LDPC decoding result includes:
predicting that the LDPC decoder will successfully decode the code block responsive to the received LLR histogram information indicating an average mutual information metric that satisfies a first threshold and a ratio or multiplication metric associated with one or more histogram bins that satisfies a second threshold.

12. The method of claim 1,
wherein predicting the LDPC decoding result includes:
predicting that the LDPC decoder will fail to successfully decode the code block responsive to the received LLR histogram information indicating an average mutual information metric that fails to satisfy a first threshold and one or more of a summation metric, a ratio metric, or a multiplication metric associated with one or more histogram bins that fails to satisfy a second threshold.

13. An apparatus configured for wireless communication, comprising:
one or more memories comprising processor-executable instructions; and
one or more processors configured to execute the processor-executable instructions and cause the apparatus to:
receive a signal comprising a code block;
predict a low density parity check (LDPC) decoding result for the code block in accordance with received log likelihood ratio (LLR) histogram information associated with the code block, the LDPC decoding result indicating whether the code block will pass a cyclic redundancy check (CRC); and
configure an LDPC decoder in accordance with the predicted LDPC decoding result for the code block.

14. The apparatus of claim 13,
wherein the one or more processors, to cause the apparatus to configure the LDPC decoder, are configured to cause the apparatus to:
configure the LDPC decoder to attempt to decode the code block responsive to the predicted LDPC decoding result indicating that LDPC decoding will be successful.

15. The apparatus of claim 13,
wherein the one or more processors, to cause the apparatus to configure the LDPC decoder, are configured to cause the apparatus to:
configure the LDPC decoder to refrain from decoding the code block responsive to the predicted LDPC decoding result indicating that LDPC decoding will be unsuccessful.

16. The apparatus of claim 13,
wherein the one or more processors, to cause the apparatus to predict the LDPC decoding result, are configured to cause the apparatus to:
obtain, from the received LLR histogram information, one or more neural network inputs; and
provide the one or more neural network inputs to a neural network that uses one or more machine learning techniques to generate the LDPC decoding result.

17. The apparatus of claim 16,
wherein the one or more neural network inputs include a plurality of bins associated with the received LLR histogram information.

18. The apparatus of claim 17,
wherein the plurality of bins associated with the received LLR histogram information are linearly spaced in an LLR domain.

19. The apparatus of claim 17,
wherein the plurality of bins associated with the received LLR histogram information are linearly spaced in a mutual information domain.

20. The apparatus of claim 16,
wherein the one or more neural network inputs include an average mutual information metric associated with the received LLR histogram information.

21. The apparatus of claim 13,
wherein the one or more processors, to cause the apparatus to predict the LDPC decoding result, are configured to cause the apparatus to:
predict that the LDPC decoder will successfully decode the code block responsive to the received LLR histogram information indicating an average mutual information metric that satisfies a threshold.

22. The apparatus of claim 13,
wherein the one or more processors, to cause the apparatus to predict the LDPC decoding result, are configured to cause the apparatus to:
predict that the LDPC decoder will successfully decode the code block responsive to the received LLR histogram information indicating an average mutual information metric that satisfies a first threshold and a summation metric associated with one or more histogram bins that satisfies a second threshold.

23. The apparatus of claim 13,
wherein the one or more processors, to cause the apparatus to predict the LDPC decoding result, are configured to cause the apparatus to:
predict that the LDPC decoder will successfully decode the code block responsive to the received LLR histogram information indicating an average mutual information metric that satisfies a first threshold and a ratio or multiplication metric associated with one or more histogram bins that satisfies a second threshold.

24. The apparatus of claim 13,
wherein the one or more processors, to cause the apparatus to predict the LDPC decoding result, are configured to cause the apparatus to:
predict that the LDPC decoder will fail to successfully decode the code block responsive to the received LLR histogram information indicating an average mutual information metric that fails to satisfy a first threshold and one or more of a summation metric, a ratio metric, or a multiplication metric associated with one or more histogram bins that fails to satisfy a second threshold.

25. A non-transitory computer-readable medium storing a set of instructions for wireless communication, the set of instructions comprising:
one or more instructions that, when executed by one or more processors of a wireless node, cause the wireless node to:

receive a signal comprising a code block;

predict a low density parity check (LDPC) decoding result for the code block in accordance with received log likelihood ratio (LLR) histogram information associated with the code block, the LDPC decoding result indicating whether the code block will pass a cyclic redundancy check (CRC); and configure an LDPC decoder in accordance with the predicted LDPC decoding result for the code block.

26. The non-transitory computer-readable medium of claim 25, wherein the one or more instructions, that cause the wireless node to configure the LDPC decoder, cause the wireless node to:

configure the LDPC decoder to attempt to decode the code block responsive to the predicted LDPC decoding result indicating that LDPC decoding will be successful.

27. The non-transitory computer-readable medium of claim 25, wherein the one or more instructions, that cause the wireless node to configure the LDPC decoder, cause the wireless node to:

configure the LDPC decoder to refrain from decoding the code block responsive to the predicted LDPC decoding result indicating that LDPC decoding will be unsuccessful.

28. An apparatus for wireless communication, comprising:

means for receiving a signal comprising a code block;

means for predicting a low density parity check (LDPC) decoding result for the code block in accordance with received log likelihood ratio (LLR) histogram information associated with the code block, the LDPC decoding result indicating whether the code block will pass a cyclic redundancy check (CRC); and means for configuring an LDPC decoder in accordance with the predicted LDPC decoding result for the code block.

29. The apparatus of claim 28, wherein the means for configuring the LDPC decoder includes:

means for configuring the LDPC decoder to attempt to decode the code block responsive to the predicted LDPC decoding result indicating that LDPC decoding will be successful.

30. The apparatus of claim 28, wherein the means for configuring the LDPC decoder includes:

means for configuring the LDPC decoder to refrain from decoding the code block responsive to the predicted LDPC decoding result indicating that LDPC decoding will be unsuccessful.

* * * * *